(12) United States Patent
Mackensen et al.

(10) Patent No.: US 12,140,120 B2
(45) Date of Patent: Nov. 12, 2024

(54) METHODD FOR OPERATING A WIND TURBINE FOR POWERING AUXILIARY DEVICES IN THE EVENT OF A GRID FAULT

(71) Applicant: Wobben Properties GmbH, Aurich (DE)

(72) Inventors: Ingo Mackensen, Aurich (DE); Kai Busker, Großefehn (DE); Stefan Gertjegerdes, Aurich (DE)

(73) Assignee: WOBBEN PROPERTIES GMBH, Aurich (DE)

(*) Notice: Subject to any disclaimer, the term of this patent is extended or adjusted under 35 U.S.C. 154(b) by 226 days.

(21) Appl. No.: 17/433,390

(22) PCT Filed: Feb. 26, 2020

(86) PCT No.: PCT/EP2020/055019
§ 371 (c)(1),
(2) Date: Aug. 24, 2021

(87) PCT Pub. No.: WO2020/174003
PCT Pub. Date: Sep. 3, 2020

(65) Prior Publication Data
US 2022/0145855 A1 May 12, 2022

(30) Foreign Application Priority Data
Feb. 26, 2019 (DE) ...................... 10 2019 104 892.3

(51) Int. Cl.
*F03D 7/02* (2006.01)
(52) U.S. Cl.
CPC ......... *F03D 7/0284* (2013.01); *F03D 7/0204* (2013.01); *F03D 7/0224* (2013.01);
(Continued)

(58) Field of Classification Search
CPC .... F03D 7/0204; F03D 7/0224; F03D 7/0284; F05B 2270/1033; F05B 2270/1071; F05B 2270/337
See application file for complete search history.

(56) References Cited

U.S. PATENT DOCUMENTS 8,084,874 B2 * 12/2011 Llorente Gonzalez ...................... F03D 7/0284
290/55
8,779,610 B2 * 7/2014 Luetze .................... H02J 3/381
290/44

(Continued)

FOREIGN PATENT DOCUMENTS

DE 102008037449 A1 4/2010
EP 1961957 A2 8/2008
EP 2146095 B1 9/2015

*Primary Examiner* — Tulsidas C Patel
*Assistant Examiner* — S. Mikailoff
(74) *Attorney, Agent, or Firm* — Seed IP Law Group LLP

(57) ABSTRACT

Provided is a method for operating a wind turbine having a generator and a rotor with rotor blades. The method includes generating electrical power from wind using the generator, using a first part of the generated power as an auxiliary component for supplying auxiliary devices of the turbine used for operating the turbine, where the auxiliary component varies up to a limit. The method includes feeding a second part of the generated electrical power into a grid as a feed-in component, checking the grid for a grid fault that does not allow feeding power into the grid and continuing the operation of the turbine when the fault is detected. The generation of power from wind is reduced to a cut-back power that corresponds to the limit the auxiliary component for operating the auxiliary devices is used from the cut-back power and remaining residual power of the cut-back power is consumed.

17 Claims, 3 Drawing Sheets

(52) U.S. Cl.
CPC ... *F05B 2260/20* (2013.01); *F05B 2270/1033* (2013.01); *F05B 2270/1071* (2013.01); *F05B 2270/337* (2013.01)

(56) References Cited

U.S. PATENT DOCUMENTS

| | | | |
|---|---|---|---|
| 2009/0206603 A1* | 8/2009 | Llorente Gonzalez | F03D 7/0284 416/37 |
| 2012/0068461 A1* | 3/2012 | Luetze | F03D 9/255 290/44 |
| 2016/0111872 A1 | 4/2016 | Kolwalkar et al. | |
| 2022/0094167 A1* | 3/2022 | Beekmann | H02J 3/381 |

* cited by examiner

METHODD FOR OPERATING A WIND TURBINE FOR POWERING AUXILIARY DEVICES IN THE EVENT OF A GRID FAULT

BACKGROUND

Technical Field

The present invention relates to a method for operating a wind turbine and the present invention also relates to a corresponding wind turbine.

Description of the Related Art

Wind turbines are known; they generate electrical power from wind in order to feed it into an electrical supply grid. Usually, or at least preferably, this takes place in so-called grid-parallel operation, in which the wind turbines feed precisely as much power into the grid as they can generate on the basis of the prevailing wind and on the basis of any maximum values.

If a grid fault occurs, with the consequence that the wind turbine cannot feed power into the electrical supply grid, the wind turbine must reduce its operation and may for example suspend its operation until the grid fault is rectified. This has the consequence however that there may be unnecessary downtimes for the wind turbine. It may therefore be advisable to allow the wind turbine at least to idle during the time of the grid fault, or to operate in a reduced operating mode, in which it generates precisely as much power as it itself consumes.

Such reduced operation is described for example in the European patent EP 2 146 095 B1. There, when a grid fault is detected, the wind turbine is run down to the level where enough power still to ensure basic functions is generated. In this case, an energy store is used for adjusting the rotor blades. However, providing and maintaining the energy store may cause additional costs here.

The German Patent and Trademark Office has searched the following further prior art in the priority application relating to the present application: DE 10 2008 037 449 A1 and US 2016/0111872 A1.

BRIEF SUMMARY

As described herein, in the event of a grid fault where it is not possible to feed into the electrical supply grid, with as little effort as possible a wind turbine can continue to be operated to the extent that at least its basic functions can be performed.

A method for operating a wind turbine is provided. Assumed here is a wind turbine which has a generator and an aerodynamic rotor. The aerodynamic rotor has in turn a number of rotor blades, which are adjustable, in particular in their blade angle. To this extent, the method is based on a conventional wind turbine.

In a first step, it is proposed that electrical energy is generated from wind by means of the generator. A first part of this generated electrical power is used as an auxiliary power component for supplying auxiliary devices that are required for operating the wind turbine. Such auxiliary devices that need power for their own operation particularly include a control device (e.g., controller), in particular a control computer or process computer, for controlling the wind turbine. They preferably also include blade adjusting devices (e.g., drive) for adjusting the rotor blades in their blade angle. Similarly, they preferably comprise an azimuth adjusting device or, depending on the construction, a number of them, for adjusting the wind turbine in its azimuthal alignment. With such azimuth adjusting devices, therefore, in particular a nacelle is turned on a tower, to be specific is usually turned into the wind.

Such auxiliary devices often do not need constant power, but are distinguished by fluctuating power consumption. Particularly, the blade adjusting devices and azimuth adjusting devices mentioned by way of example are only used sporadically, so that their power consumption also fluctuates correspondingly. Their power consumption may even change suddenly, to be specific if they change between a switched-on state and a switched-off state.

But also the process computer mentioned may consume more or less power, depending on the extent to which its capacity is utilized. The same may also apply for example to cooling devices, which may be controlled temperature-dependently and therefore consume correspondingly more or less power.

The variation of this auxiliary power component is not unconfined here, but is restricted to an upper auxiliary power limit. Such an upper auxiliary power limit may for example represent a value that is adopted when all of the auxiliary devices are being operated. Some auxiliary devices, such as for example an exciter generator for setting an exciter power of a separately excited synchronous generator, if the wind turbine uses such a generator, may consume different amounts of power depending on the operating point of the wind turbine.

In any case, one part of the generated power is needed for these auxiliary devices and a second part of the generated electrical power, that is to say in particular the power remaining after the first part has been removed, is fed into an electrical supply grid as a feed-in power component. To this extent, that may describe a usual operating case of a wind turbine.

It is now further proposed that the electrical supply grid is checked for a grid fault. A grid fault refers here to a situation where it is not possible to feed electrical power of the wind turbine into the electrical supply grid. There may particularly be technical reasons for this, but it also applies to the situation in which a grid operator of the electrical supply grid stipulates that at that moment power is not fed into the electrical supply grid. However, there is usually likewise a technical reason for such a stipulation.

If such a grid fault is detected here, it is proposed to continue the operation of the wind turbine as unchanged as possible. However, the generation of electrical power from wind is reduced to a cut-back power.

It is in this case proposed that the cut-back power corresponds in its level to the upper auxiliary power limit, or lies above it. In particular, it may be proposed that the cut-back power lies above the upper auxiliary power limit by a maximum of 30%. However, it also comes into consideration that the cut-back power is set precisely to the level of the upper auxiliary power limit, though the cut-back power could lie minimally above it, or minimally below it.

The required auxiliary power for operating the auxiliary devices is then used from the cut-back power. The wind turbine is then therefore in a state in which it does not feed into the electrical supply grid and has in return reduced its power generation, to be specific to the cut-back power, and this cut-back power is chosen to be great enough to allow it to supply the auxiliary devices, even if they reach the upper auxiliary power limit in their power requirement. The auxiliary devices can therefore continue to be operated normally even in this event of a grid fault.

It is then also proposed that a residual power of the cut-back power remaining in this case is consumed. In particular, it is proposed that it is converted into heat.

This is based on the idea that, in the event of a grid fault, the wind turbine can continue to be operated normally, apart from the feeding in of electrical power, without an additional electrical energy store being required, such as for example an additional electrical battery store. To be specific, for this purpose it is proposed that, in principle, the fluctuating power requirement of the auxiliary devices is not buffered by means of an energy store, but instead it is taken into account by in principle generating its maximum value of power. If the auxiliary power needed lies below that, this excess component can be simply consumed, that is to say particularly converted into heat. This is also based in particular on the realization that the waste of energy involved is inconsequential, because there is no use for this energy during the grid fault and it also cannot be buffer-stored. Nevertheless, however, the use of an additional store can be avoided.

According to one embodiment, it is proposed that an inverter with a DC link is used for the feeding in of electrical power. Such an inverter uses the DC link as a power input or energy source, from which it generates an alternating voltage signal or an alternating current signal for feeding into the electrical supply grid. Instead of one inverter, there may also be a number of inverters, or a number of inverter modules may together be referred to as an inverter. They may each use a DC link, or use a shared DC link.

It is proposed for this that, when the grid fault is detected, the cut-back power, or part of it, is transferred to the DC link without the inverter feeding power into the electrical supply grid. The DC link consequently receives the then cut-back power generated by the generator, and consequently this power can be further distributed to the auxiliary devices by the DC link. In the simplest case, the entire cut-back power is passed to the DC link and further distributed from there. However, it also comes into consideration that only part of the cut-back power is transferred to the DC link if another part of the cut-back power is already used upstream of the DC link, with respect to the power flow. It therefore particularly comes into consideration that the inverter is arranged in a base of the tower and auxiliary devices that are operated in the region of the nacelle are already supplied with power there. Auxiliary devices that are operated in the base of the tower, such as for example a cooling device of the inverter, can obtain their power from the DC link.

However, it also comes into consideration that some or even all of the auxiliary devices that are arranged in the nacelle, such as for example an azimuth adjusting device and/or a pitch adjusting device, are supplied with power directly or indirectly from the DC link.

At least it is proposed that the remaining residual power, which is therefore not used by the auxiliary devices, is fed into the DC link.

For this purpose, it is also proposed that power from the DC link, in particular the remaining residual power, or at least part of the remaining residual power, is removed by means of a chopper circuit into a chopper resistor for conversion into heat. Such a chopper circuit can generate a pulsed current from the DC link by correspondingly clocked activation of a semiconductor switch and feed it to the chopper resistor, which may also be formed as a bank of resistors. There, this current, and consequently the power that is derived from the DC link, is converted into heat and is thereby consumed.

In this way it can particularly be achieved that the auxiliary devices can be continuously supplied with the required auxiliary power in an easy manner. For this, the generator generates a sufficient amount of power and, from it, each auxiliary device is supplied according to its requirement at the time. The generator in this case generates at least as much power as all these auxiliary devices require as a maximum at the operating point concerned, and consequently often generates more power than is needed. This additional power is the remaining residual power and can be removed from the DC link, and hence consumed, by means of the chopper circuit in an easy manner.

In particular, it is proposed that the chopper circuit removes power from the DC link in dependence on a sensed link voltage. In particular, a first reference voltage may be prescribed for this, so that the chopper circuit begins to operate as soon as the link voltage exceeds this first reference voltage. A further, higher second reference voltage may also be prescribed, so that the first and second reference voltages span a reference band. For this, it may be provided that the chopper circuit generates a current that is all the greater the closer the DC link gets to the second reference voltage above the first reference voltage.

In this way, the chopper circuit, and consequently the removal of the remaining residual power, can be controlled in an easy manner. It may be the case here in particular that the link voltage is also controlled, to be specific to the first reference voltage if only one reference voltage is prescribed, or to a voltage in the voltage band between the first and second reference voltages if both reference voltages are prescribed. This may particularly also be advantageous when the grid fault has been rectified and the wind turbine is intended to feed power into the electrical supply grid again as soon as possible. If it then already has a link voltage of the desired level at that moment, it can immediately feed power into the electrical supply grid. In particular, it can also immediately feed power into the electrical supply grid at the level of the remaining residual power removed up to that time.

According to one embodiment, it is proposed that the upper auxiliary power limit is determined in dependence on an operating point at the time of the wind turbine, that it is determined in dependence on system properties of the wind turbine and/or that it is sensed in a predetermined measuring time period before the occurrence of the grid fault. The upper auxiliary power limit may be defined by the power that all of the auxiliary devices together can consume as a maximum. Such a value may be calculated as a maximum value from the system properties of the wind turbine, that is to say how the wind turbine is constructed, and particularly which auxiliary devices it has. In this case, the upper auxiliary power limit alone should be determined once and for all for the wind turbine as though it were exclusively determined in dependence on the system properties of the wind turbine.

However, such a maximum value can often only be reached in exceptional cases or possibly never. If for example the wind turbine has blade heaters for deicing the rotor blades, they are only required at correspondingly low temperatures. If these low temperatures occur, in turn cooling devices in the wind turbine do not reach their maximum power consumption. Therefore, it is proposed to determine the upper auxiliary power limit entirely or partly in dependence on an operating point at the time of the wind turbine.

Determining the upper auxiliary power limit entirely or partly in dependence on an operating point at the time of the wind turbine is also advisable if in the case of a separately excited synchronous generator a power consumption of an exciter generator depends on the operating point. To be specific, depending on the operating point of the wind turbine, this exciter generator requires more or less power, but the operating point does not change quickly, at least usually does not change suddenly.

This is different with an azimuth adjusting device, which in principle can always come into action to carry out an azimuth readjustment because the wind direction has changed. For such as azimuth adjusting device as an auxiliary device, its power consumption when it is actuated should therefore be taken into account. If it is not actuated, its then only potential power consumption consequently represents part of the residual power that would have to be removed.

Also in the case of a blade adjusting device it can be expected that it must occasionally readjust or adjust the rotor blades. However, operating points at which an adjustment is not to be expected, for example particularly in part-load operation when the prevailing wind is weak, come into consideration in the case of a blade adjusting device. If, however, the prevailing wind lies above a rated wind speed, it is to be expected that the wind turbine responds to variations in the wind by readjusting the rotor blades, so that the blade adjusting devices are then frequently used. Correspondingly, a power consumption of the blade adjusting devices may be taken into account operating-point-dependently in the calculation of the upper auxiliary power limit, or not taken into account. The same applies if a reduced power is maintained instead of rated power.

Also or alternatively, the upper auxiliary power limit may instead be sensed by measuring instruments, in that the required auxiliary power before the occurrence of the grid fault was sensed and the upper auxiliary power limit obtained directly from it. Such a consumed auxiliary power may in this case be obtained as the difference between the power that is fed in, which is usually known, and the generator power that is generated, which can likewise be sensed. Therefore, there is no need for the power consumption of each individual auxiliary device to be individually sensed. Such a consideration can also be used to derive empirical values, which are set in relation to the operating point at the time in each case. Therefore, the required auxiliary power that was applicable to an operating point is sensed by measuring instruments and recorded. The upper auxiliary power limit can then be derived later, dependent on the operating point and these measured power values.

It is particularly proposed that, when the grid fault is detected, the auxiliary power component continues to be transferred by the generator to the auxiliary devices for supplying them, without additional buffer storage in an electrical store. The method therefore operates in such a way that this power that is still required by the auxiliary devices is provided to the auxiliary devices by the generator directly, at least without additional buffer storage. Although this auxiliary power component can be at least partly transferred to a DC link, which usually has link capacitors, there is no additional buffer storage in an electrical store.

On the one hand, such link capacitors cannot be regarded as electrical stores for buffer storing a relevant amount of energy that is required for operating the auxiliary devices, on the other hand this also would not constitute additional buffer storage, since the DC link with corresponding link capacitors is also present during operation without a grid fault and, particularly, the power that is fed to the auxiliary devices via the DC link to supply them is also fed to the respective auxiliary devices via the DC link both in the event of a grid fault and during operation without this grid fault. Consequently, there is no additional buffer storage in an electrical store.

It is consequently particularly provided that the transfer from the generator to the auxiliary devices takes place without prolonged buffer storage in an electrical store. This particularly means that this transfer manages without buffer storage over a time period of more than 100 milliseconds (ms). Particularly, such possible buffer storage for a very short time period of less than 100 ms should not be understood as constituting storage in the sense of keeping energy, but at most in the sense of signal smoothing.

It is particularly provided that, when the grid fault is detected, supplying power to the auxiliary devices is continued unchanged. In addition or as an alternative, it is proposed that the auxiliary devices are not cut back. It has particularly been realized that it is advantageous to continue the operation of the wind turbine as unchanged as possible. Although the feeding in must be reduced or interrupted, and a reduction of the generator power is correspondingly also expedient, with the proposed methods the supply of power to the auxiliary devices need not undergo any change. Particularly, the entire supply structure can then continue to be used. This concerns a physical structure such as lines and connections that are used, but substantially also the control structure with which the corresponding auxiliary devices are activated.

It has particularly also been realized that the auxiliary devices need not be cut back, which then has the advantage that in principle structures, and in particular controllers, can continue to be used normally. Particularly, there is no need for an emergency plan to be prepared.

According to one embodiment, it is proposed that, when the grid fault is detected, the wind turbine is disconnected from the electrical supply grid. Such a grid fault that results in such disconnection from the grid may be a serious grid fault, and the method, which can in principle continue to operate the wind turbine even without feeding into the electrical supply grid, is also proposed for this. The disconnection from the grid also has the effect of ruling out the wind turbine obtaining power for auxiliary devices from the electrical supply grid. This case too can advantageously also be covered.

According to one embodiment, it is proposed that, when the grid fault is detected and after that, the wind turbine continues to be operated without feeding electrical power into the electrical supply grid until the grid fault is rectified.

For this purpose, it is also proposed that this takes place in such a way that the feeding of electrical power into the electrical supply grid can be resumed without delay and also, or alternatively, the electrical supply grid or part thereof can be run up again in a black starting mode.

This is particularly based on the idea that, in the event of a grid recovery or black start of the electrical supply grid or part thereof, sometimes quick action is necessary. Delay times arising because a wind turbine first has to be run up to an operating point may be a hindrance here. If, as proposed, the wind turbine initially continues to be operated substantially normally in the event of a grid fault, it is immediately available at the end of the grid fault and can immediately feed in power. In the case of the proposed method, that is possible even without an additional store.

Particularly preferably, this is carried out by the link voltage of the DC link of the inverter being controlled to a predetermined standby voltage by means of the chopper circuit during the grid fault. This is precisely such a link voltage with which the inverter can in principle immediately feed into the electrical supply grid on demand, or in the case of black starting can even build it up. The chopper circuit allows this voltage to be set at the DC link by closed-loop control, that is to say to be corrected. This additionally has the advantage that, whenever the inverter feeds into the electrical supply grid again, it can immediately feed in power at the level at which the chopper circuit removed power from the DC link up to that moment.

It may optionally be provided that, in view of an expected end of the grid fault, the wind turbine increases the power generated and likewise by means of the chopper circuit removes this excess power from the DC link. If, after the network fault, the wind turbine then changes back to the feeding-in mode, this excess power is correspondingly likewise available for feeding in. It even forms a control range here, since it can but does not have to be fed in to the full extent. This can be regulated by means of the chopper circuit.

In the case of a network recovery or black start, the wind turbine preferably uses a supporting mode, in which a voltage control and/or frequency control that is provided for supporting the network recovery or black start is used. Such voltage control and/or frequency control is particularly designed for the purpose of controlling the grid voltage or the grid frequency. For this, the corresponding grid variable, to be specific the grid voltage or the grid frequency, is fed back.

The auxiliary devices preferably comprise at least one auxiliary device from the following list:
  one or more blade adjustment devices (e.g., drives) for adjusting the rotor blades in their blade angle,
  one or more azimuth adjusting devices (e.g., drives) for adjusting a nacelle alignment of the wind turbine,
  an exciter generator for generating an exciter current of the generator if the generator is formed as a separately excited synchronous generator,
  one or more ventilating devices (e.g., fans or exhausts) for ventilating the wind turbine,
  one or more cooling devices (e.g., radiators) for cooling the generator,
  one more cooling devices (e.g., fans) for cooling semiconductor components, in particular in the inverter and/or in the chopper circuit,
  a control device (e.g., controller) for controlling the operation of the wind turbine.

All of these possible auxiliary devices mentioned may also be required for operating the wind turbine when the wind turbine is not feeding into the electrical supply grid as a result of the grid fault. The meaning of the blade adjusting devices, the azimuth adjusting devices and the exciter generator has already been explained.

Ventilating devices may for example be arranged in the tower, in particular in the base of the tower, and/or in a nacelle of the wind turbine, and provide ventilation of the wind turbine there. This may take place for example by a corresponding blower, which correspondingly needs power to operate. However, such a blower does not necessarily have to be permanently switched on, and can consequently also lead to a fluctuation in the power for the auxiliary devices Cooling devices, both for cooling the generator or for cooling semiconductor components, may also have corresponding fans, which need corresponding current. A cooling device of the inverter may for example also be required, at least for a short time, when the inverter is not feeding into the electrical supply grid, because for example it was still at a high temperature from its operation before the feeding in.

It also comes into consideration that the inverter is used for operating an auxiliary device of the wind turbine and would have to be cooled during this activity. Apart from that, the chopper circuit mentioned may also be understood as part of the inverter. Particularly in the case of the proposed method, such a chopper circuit may be very active, particularly in the proposed operation of the wind turbine without feeding in, and become correspondingly hot and require cooling.

A control device for controlling the operation of the wind turbine may particularly be formed as a process computer or comprise a process computer, which likewise must be cooled, particularly by using a corresponding fan.

It is particularly proposed according to one embodiment that the cut-back power is generated at such a level that it can provide at least a temporary power component for operating at least one only temporarily required auxiliary device. Such a temporarily required auxiliary component is then either used for operating this at least one only temporarily required auxiliary device, or it is removed by means of the chopper circuit. Therefore, an auxiliary device that leads to fluctuations in its power consumption particularly because it is switched on or off is proposed here. For this purpose, it is proposed that sufficient power is generated by the generator to supply this auxiliary device in the switched-on state. If it is then switched off, its power continues to be generated by the generator, but is no longer consumed by the auxiliary device but is removed by the chopper circuit.

Such auxiliary devices may be particularly one of the already mentioned blade adjusting devices or else one of the mentioned azimuth adjusting devices, or in each case a number of them. Such adjusting devices, both those for the blade adjustment and those for the azimuth adjustment, often do not engage in continuous adjusting activity, but in principle are only switched on when required. However, such a requirement may also occur several times a minute.

A wind turbine is also proposed.

Such a wind turbine comprises a generator and an aerodynamic rotor with a number of rotor blades, and the wind turbine also comprises
  a generator, which is prepared to generate electrical power from wind,
  one or more auxiliary devices for performing auxiliary functions for the operation of the wind turbine, the auxiliary devices using a first part of the generated electrical power as an auxiliary power component, wherein
  the auxiliary power component varies in its level up to an upper auxiliary power limit,
  an inverter for feeding a second part of the generated electrical power into an electrical supply grid, this second part forming a feed-in power component, which in particular has remained after removal of the first part,
  a control device for checking the electrical supply grid for a grid fault that does not allow feeding of electrical power of the wind turbine into the electrical supply grid, wherein
  the wind turbine, in particular the control device, is prepared to continue the operation of the wind turbine when the grid fault is detected, wherein
  generation of the electrical power from wind is reduced to a cut-back power, wherein
  the cut-back power corresponds in its level to the upper auxiliary power limit, or lies above it,
  the required auxiliary power component for operating the auxiliary devices is used from the cut-back power and residual power of the cut-back power remaining in this case is consumed, in particular is converted into heat.

Such a wind turbine consequently operates in particular in such a way as explained in connection with embodiments of the method for operating a wind turbine described above. For this purpose, the wind turbine particularly has an inverter and one or more auxiliary devices. An inverter may in this case also be made up of a number of inverter modules, or to this extent form an inverter device. Coming into consideration as auxiliary devices are particularly those devices that have been mentioned above according to at least one embodiment of the operating method.

BRIEF DESCRIPTION OF THE SEVERAL VIEWS OF THE DRAWINGS

The invention is explained in more detail below by way of example on the basis of exemplary embodiments with reference to the accompanying figures.

DETAILED DESCRIPTION

Figure 1:
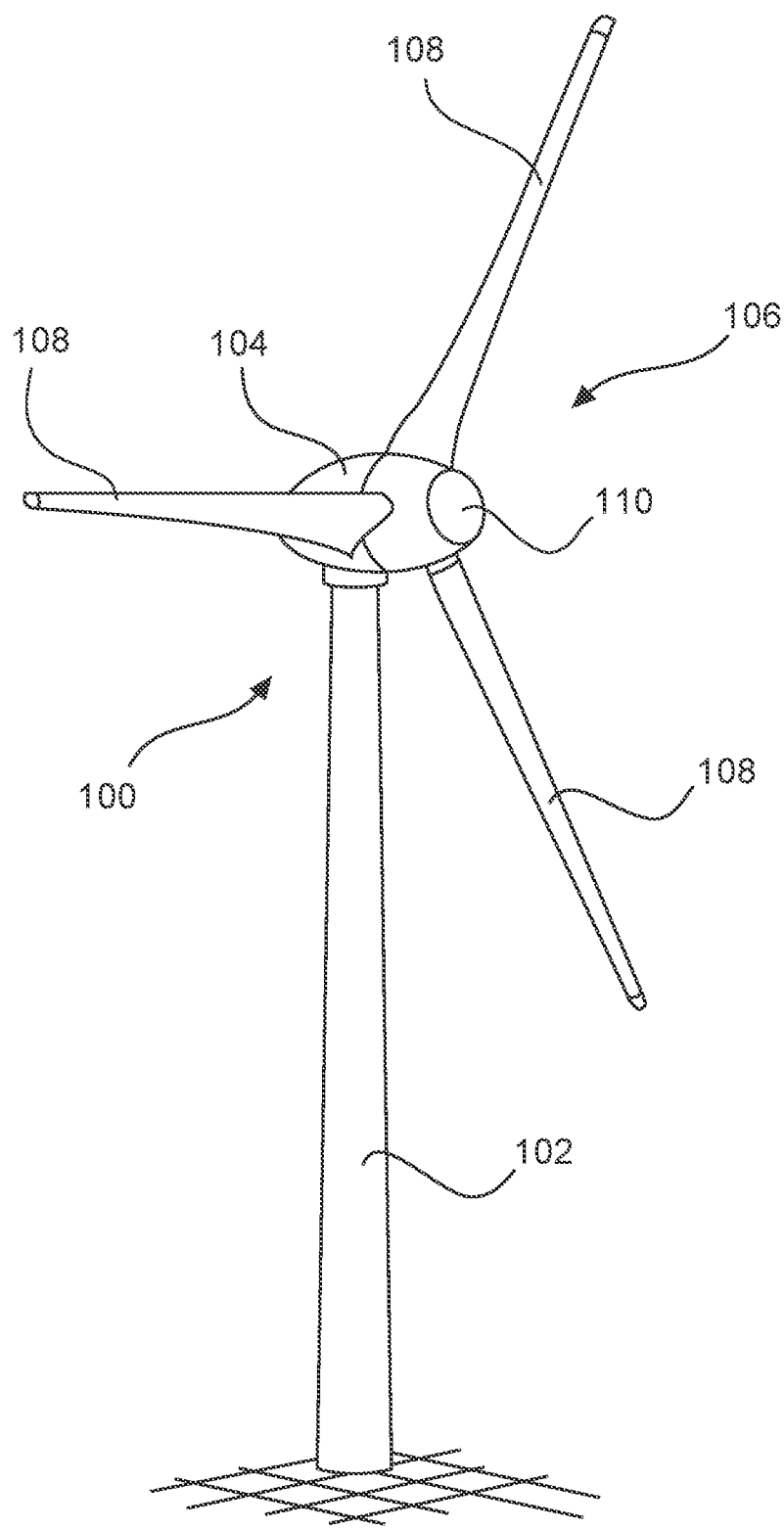
FIG. 1 shows a wind turbine in a perspective representation.

FIG. 1 shows a wind turbine 100 with a tower 102 and a nacelle 104. Arranged on the nacelle 104 is a rotor 106 with three rotor blades 108 and a spinner 110. During operation, the rotor 106 is set in a rotary motion by the wind, and thereby drives a generator in the nacelle 104.

Figure 2:
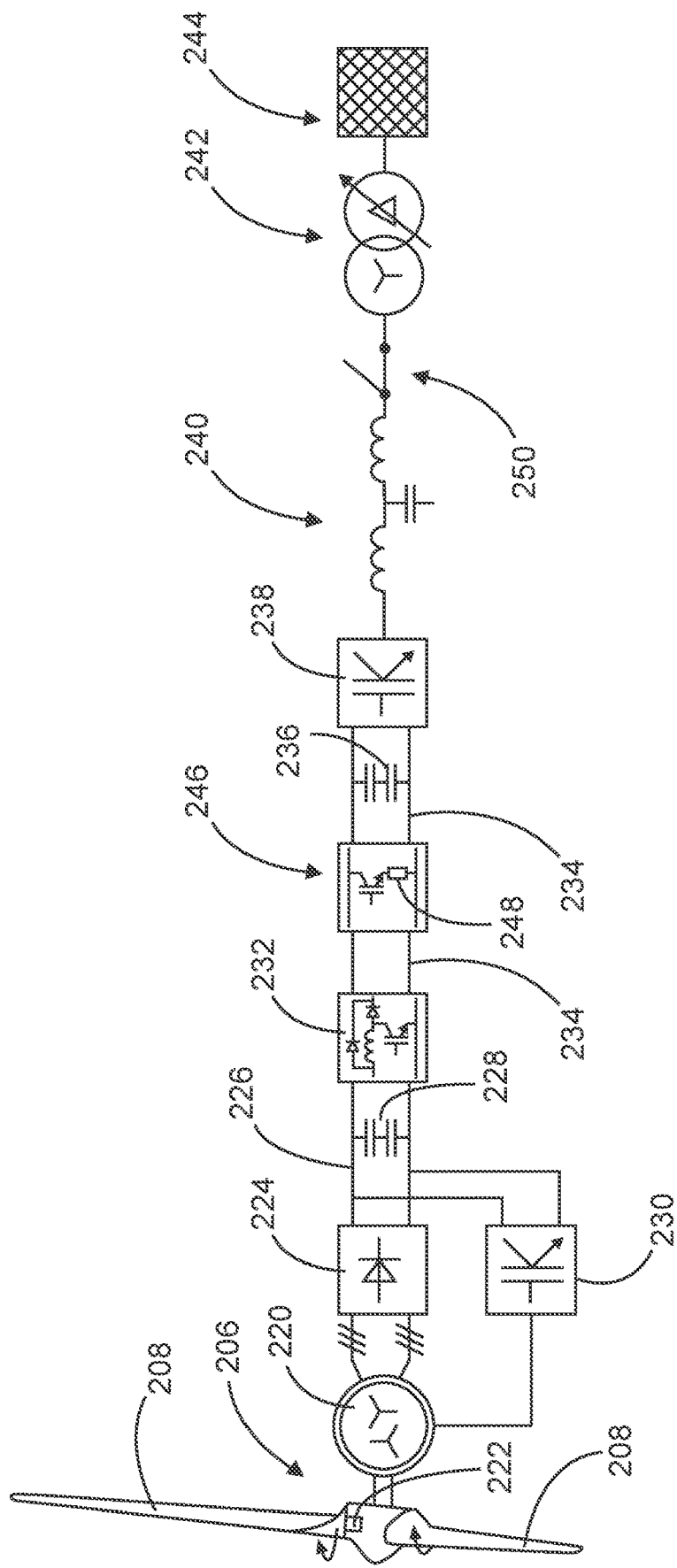
FIG. 2 shows a functional part of a wind turbine in a schematic representation.

FIG. 2 particularly shows a power train to illustrate the flow of power from the generator to the grid feed-in. For this purpose, the wind turbine has an aerodynamic rotor 206 with a number of rotor blades 208. During operation, this rotor 206 is consequently driven by the wind and thereby drives a generator 220.

The rotor 206 has rotor blades 208 that can be changed in their angle of attack. The adjustability of the rotor blades 208 is indicated by way of example by two arrows. For the adjustment, a pitch drive 222 is used each rotor blade 208 and one of these is schematically depicted in FIG. 2 as a corresponding block. This allows the angle of attack of the rotor blades 208 to be changed, in order in this way to change the aerodynamic effectiveness of the rotor 206, with respect to the wind. For example, the rotor blades 208 may be partially or completely turned out of the wind by means of the pitch drives 222, so that as a result the rotor 206 can take less power from the wind. In continuous operation, the pitch drives 222 can be supplied with power that can be taken from the power generated by the generator 220.

The generator 220 is formed here as a separately excited synchronous generator and has as a preferred embodiment a six-phase electrical configuration. Accordingly, two three-phase stator windings are present and the generator 220 consequently generates a six-phase stator current, which is fed to a rectifier 224.

The rectifier 224 rectifies the stator current thus obtained and passes it to a first DC link 226. The first DC link 226 has a first link capacitor 228. This first link capacitor 228 may bring about a voltage smoothing or voltage stabilization in the first DC link 226.

The first DC link 226 also supplies an exciter generator 230, which generates an exciter current or an exciter voltage, and consequently generates an exciter power for the separately excited synchronous generator 220 and correspondingly feeds it to the generator 220.

It can also be seen here from FIG. 2 that the exciter generator 230 also takes its power component from the power that the generator 220 generates from the wind.

Also provided is a step-up converter 232, which can raise the link voltage of the first DC link 226, particularly when there is low power generation by the generator 220. The DC voltage thus increased is then provided on the second DC link 234 by the step-up converter 232. Instead of the rectifier 224, first DC link 226, step-up converter 232 and second DC link 234, a controlled rectifier could also be provided, which provides the generator power that is generated directly with the desired voltage at the second DC link 234, though the second DC link would then be the only DC link. The exciter generator 230 can then be supplied with power by this single DC link. Such a controlled rectifier would consequently substantially replace the rectifier 224, first DC link 226 and step-up converter 232.

The second DC link 234 has a second link capacitor 236, which has a substantially quite similar function to the first link capacitor 228 of the first DC link 226.

The DC voltage is inverted by the second DC link 234, by an inverter 238, and is output via a grid filter 240 and fed into the electrical supply grid 244 via the grid transformer 242, which may be formed as a variable transformer.

In normal operation, electrical power is consequently generated from wind by the rotor 206 and the generator 220. Part of this power is used for auxiliary devices, such as the indicated pitch drives 222 and the exciter generator 230. However, further and/or other auxiliary devices also come into consideration, such as for example an azimuth adjusting device (drive), with which the rotor 206 can be aligned with the wind. Usually, for this purpose the entire nacelle, such as the nacelle 104 of the wind turbine 100 of FIG. 1, is turned and aligned with the wind.

The remaining power, which is usually the greater proportion by far of the power generated, is then fed into the electrical supply grid 244.

Substantially, a voltage level of a link voltage of the second DC link is controlled by the inverter 238 inverting a correspondingly great or small amount of power thereof and ultimately feeding it into the electrical supply grid 244. This may particularly also take place voltage-dependently, to be specific dependent on the link voltage of the second DC link, so that the inverter 238 then substantially controls the link voltage of the second DC link.

It may also happen that the link voltage of the second DC link 234 nevertheless reaches too high a value, and then a chopper circuit 246, which is likewise arranged in the second DC link 234, will remove power by generating corresponding current pulses, to be specific in such a way that these current pulses lead to a current that is removed by a chopper resistor 248, to be specific in that the power removed is converted into heat in the chopper resistor 248.

If faulty operation then occurs, in which no power can be fed into the electrical supply grid 244, which is indicated by the opened grid switch 250, the power generated by the generator 220 is reduced, to be specific to a cut-back power that corresponds in its level to an upper auxiliary power limit. This upper auxiliary power limit indicates the power that is required as a maximum by all of the auxiliary devices of the wind turbine together, at least is required as a maximum in the operating situation at the time. For this purpose, in particular the rotor blades 208 may be turned out of the wind by their pitch drives 222 to such an extent that only this cut-back power is generated.

However, the auxiliary devices do not consume the entire auxiliary power that is provided according to the upper auxiliary power limit the whole time or possibly even at all, or almost at all. Particularly, strong fluctuations in power must be expected due to the switching on and off of auxiliary devices. This applies particularly to the pitch drives 222, but also to the azimuth drives that are mentioned above but are not shown in FIG. 2.

To allow for such a fluctuating power requirement, sometimes fluctuating suddenly, a store is not used, but instead excess power is in each case removed from the second DC link 234 by the chopper circuit 246.

Figure 3:
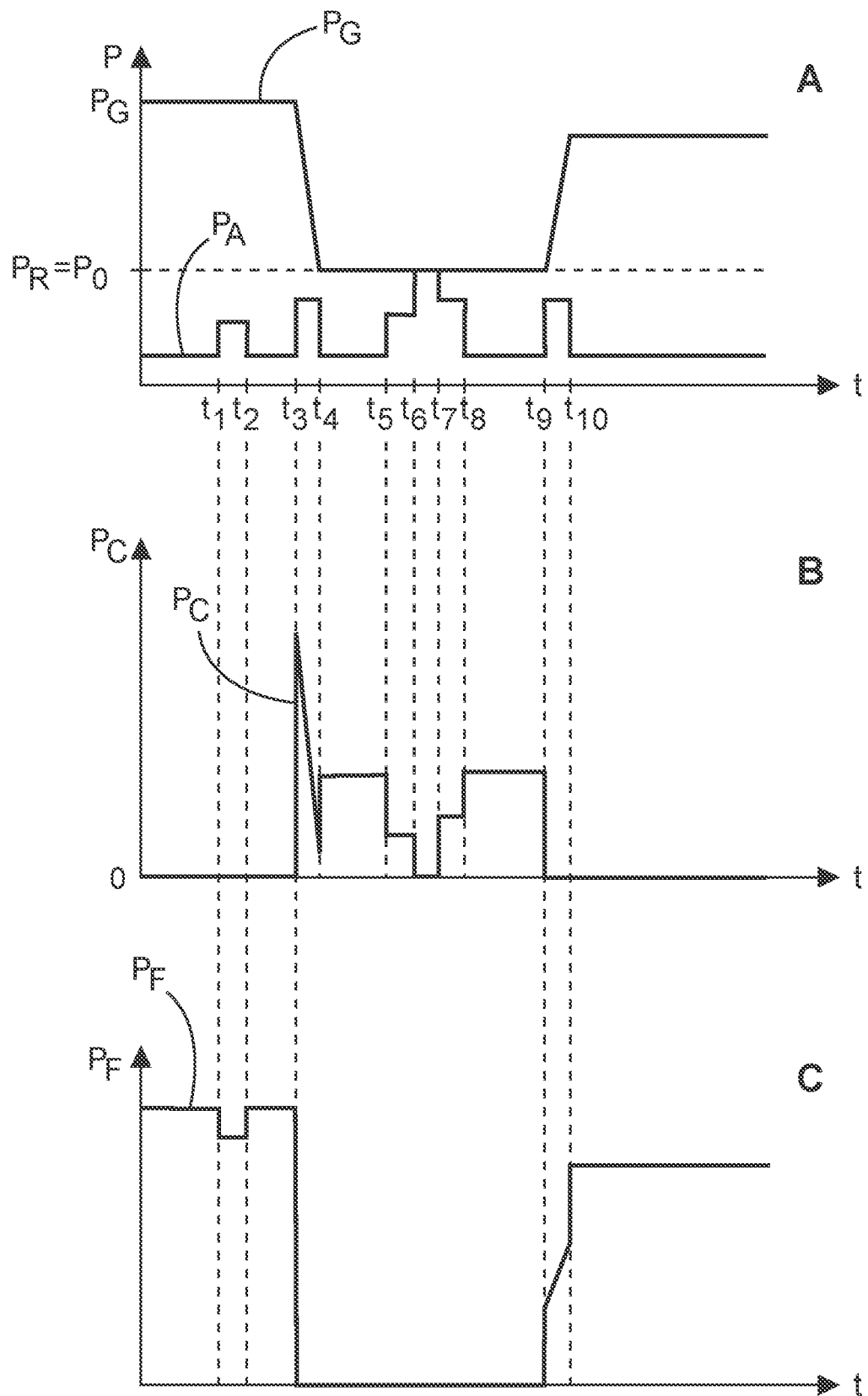
FIG. 3 shows a diagram for explaining a proposed power control.

FIG. 3 schematically shows possible power variation curves to illustrate the proposed power management. FIG. 3 shows here three diagrams represented one above the other, which use the same time axis. In the upper diagram A, the upper auxiliary power limit $P_0$ is represented by a horizontal dashed line. Shown respectively underneath is the auxiliary power $P_A$ consumed overall by all of the auxiliary devices. For the purposes of illustration, only a few fluctuations or variations of the auxiliary power outputs PA are shown, to be specific illustrating only a few stages. These stages may be caused for example by the switching on or off of the pitch drives and the azimuth drives. For example, at the point in time $t_1$ the wind direction could have changed to such an extent that the azimuth drives align the wind turbine with the wind and require power for this, so that the auxiliary power $P_A$ increases there, while at the point in time $t_2$ the azimuth adjustment has ended. To this extent, the auxiliary power $P_A$ shows consumed power.

Also depicted in diagram A is the generator power $P_G$ generated, and the diagram to this extent begins with normal operation, in which the generator generates power and feeds it into the electrical power grid after drawing off the auxiliary power $P_A$. Correspondingly shown is a characteristic curve of the generator power $P_G$, which may also fluctuate.

At the point in time $t_3$, a grid fault occurs, immediately ruling out any feeding of electrical power into the electrical supply grid. Particularly, the grid disconnecting switch 250 shown in FIG. 2 could then be opened. At this point in time, the generator power $P_G$ is then reduced to a cut-back power $P_R$, which in the example shown corresponds to the upper auxiliary power limit $P_0$. In other embodiments or other situations, the cut-back power $P_R$ may however also be greater than the upper auxiliary power limit $P_0$.

For reducing the generator power, the blades are turned out of the wind, at least partly, so that the pitch drives are activated. Correspondingly, the auxiliary power $P_A$ therefore represents the consumed auxiliary power at the point in time $t_3$. At the point in time $t_4$, the blade adjustment by means of the pitch drives has then achieved its aim and it has been possible to reduce the generator power to the desired value of the cut-back power $P_R$. The pitch drives could then be switched off again, so that the consumed auxiliary power $P_A$ also falls again.

As from the point in time $t_3$, there is consequently a grid fault, but the wind turbine continues to be operated substantially normally, apart from the fact that the generator power $P_G$ has been reduced to the cut-back power $P_R$. Even in this cut-back operating mode, it may happen that the wind turbine must be aligned again in its azimuthal alignment. This is for example indicated at the point in time $t_8$ by way of example. With varying wind, it may likewise happen that a pitch adjustment becomes necessary, and that is illustrated by way of example at the point in time $t_6$. At the point in time $t_6$, the azimuth adjustment is still in operation, so that the two power requirements add together and in this example even reach the upper auxiliary power limit $P_0$. At the point in time $t_7$, the azimuth adjustment has then ended, though the pitch adjustment still has not, but then at the point in time $t_8$ has ended.

At the point in time $t_8$, the entire auxiliary power $P_A$ consumed has consequently assumed a comparatively very small value. However, power outputs continue to be required, particularly for an exciter generator, such as the exciter generator 230 of FIG. 2. At this stage it is also pointed out that the power amplitudes shown do not have to be characteristic in terms of the value. Particularly, usually the auxiliary component, that is to say the entire auxiliary power $P_A$, is a much smaller proportion of the generator power $P_G$ in normal operation, that is to say before the point in time $t_3$.

At the point in time $t_9$, it is then assumed that the grid fault has ended and the rotor blades are then turned again into the wind, in order to generate as much power as possible. This has then ended at the point in time $t_{10}$ and the generator power $P_G$ has assumed a normal value again, which does not have to correspond to the value before the grid fault.

In addition to the characteristic power curve given by way of example in diagram A, the power $P_C$ consumed by the chopper circuit at the corresponding times is illustrated in diagram B. In normal operation, that is to say up until the point in time $t_3$, no power needs to be consumed, that is to say chopped away. At the beginning of the grid fault at the point in time $t_3$, however, all excess power of the generator must be immediately chopped away, since in the case explained even the grid switch 250 has been opened in FIG. 2. The chopper power $P_C$ consequently suddenly increases at the point in time $t_3$ to a high value, to be specific the difference between the generator power $P_G$ and the auxiliary power $P_A$. With the falling of the generator power $P_G$, the chopper power $P_C$ also falls correspondingly. However, it does not fall to zero, because more power than the auxiliary devices consume is always still generated. The generator power $P_G$ is therefore greater than the auxiliary power $P_A$ consumed overall.

At the point in time $t_4$, the chopper power $P_C$ has reached a comparatively low value, but immediately jumps up again because the pitch drives are switched off, and consequently suddenly less auxiliary power $P_A$ is consumed. At the point in time $t_5$, the auxiliary power $P_A$ increases to some extent as a result of the azimuth adjustment, so that the chopper power $P_C$ falls correspondingly. At the point in time $t_6$, the auxiliary power $P_A$ even reaches the upper auxiliary power limit $P_0$, so that the chopper power $P_C$ falls to zero, but only until the point in time $t_7$. It then increases again, and at the point in time $t_8$ increases yet again.

At the point in time $t_9$, the grid fault has then ended, and consequently the chopper power $P_C$ falls because the power is then fed into the electrical supply grid. This is also shown in an illustrative manner. In one case, it also comes into consideration here that, to achieve a stable situation in the grid after the grid fault, the entire power that can be generated is not fed in immediately, but instead for example the power increases slowly. Correspondingly, either the rotor blades may be adjusted more slowly and/or else the chopper circuit may be used for raising the fed-in power and part of the power chopped away.

Diagram C explains the characteristic curve of the fed-in power $P_F$. At the beginning, the generator power $P_G$ less the auxiliary power $P_A$ is fed in. At the point in time $t_1$, a little more auxiliary power $P_A$ is used, because of the azimuth adjustment described, and this is taken from the fed-in power $P_F$, which is consequently correspondingly reduced there. At the point in time $t_2$, it increases again however, up until the point in time $t_3$. At the point in time $t_3$, a grid fault occurs and the fed-in power immediately falls to zero.

Only at the point in time $t_9$ does the fed-in power increase again. At this point in time, it can increase suddenly, by the value of the chopper power less the power then required for the pitch drives. At point in time $t_2$, the power for the pitch drives is then also no longer applicable and the fed-in power $P_F$ can be correspondingly increased.

It is consequently evident that the auxiliary drives always receive sufficient power, even in the event of a grid fault, without a store being required. The control can be carried out as before, in particular the activation of the chopper circuit can also be used as before. By not taking away the power of the DC link, to be specific for example in the DC link 234 of FIG. 2, the link voltage of the second DC link can increase to such an extent that the chopper circuit is triggered and the power not taken is consumed. In addition, here too the response voltage of the chopper circuit may be lowered.

The invention claimed is:

1. A method for operating a wind turbine, the wind turbine having a generator and an aerodynamic rotor with a plurality of rotor blades, the method comprising:
    generating electrical power from wind using the generator;
    using a first portion of the generated electrical power as an auxiliary power component for supplying auxiliary devices of the wind turbine that are used for operating the wind turbine, wherein the auxiliary power component is variable and has an upper auxiliary power limit;
    feeding a second portion of the generated electrical power into an electrical supply grid as a feed-in power component;
    checking the electrical supply grid for a grid fault that prevents feeding of the second portion of the generated electrical power of the wind turbine into the electrical supply grid;
    detecting the grid fault; and
    in response to detecting the grid fault, continuing to operate the wind turbine including at least:
        cutting back the generation of electrical power from the wind to a cut-back power, wherein the cut-back power is equivalent to the upper auxiliary power limit or is greater than the upper auxiliary power limit;
        drawing the auxiliary power component for supplying the auxiliary devices from the cut-back power; and
        consuming residual power of the cut-back power, the residual power being an amount of the cut-back power remaining after drawing the auxiliary power component.

2. The method as claimed in claim 1, wherein the feeding of the second portion of the generated electrical power into the electrical supply grid as the feed-in power component occurs via an inverter with a DC link, and
    the method further comprises:
    in response to detecting the grid fault, transferring the cut-back power or a portion of the cut-back power to the DC link without the inverter feeding power into the electrical supply grid; and
    consuming power from the DC link by a chopper resistor of a chopper circuit for conversion into heat.

3. The method as claimed in claim 2, wherein the power consumed by the chopper circuit is the residual power or a portion of the residual power.

4. The method as claimed in claim 2, further comprising:
    consuming, by the chopper circuit, the power from the DC link based on a sensed link voltage; and/or
    supplying at least one auxiliary device of the auxiliary devices with the power from the DC link.

5. The method as claimed in claim 1, further comprising:
    in response to detecting the grid fault, continuing to transfer the auxiliary power component from the generator to the auxiliary devices for supplying the auxiliary devices via a DC link, the DC link including at least one link capacitor,
    wherein the auxiliary power component is transferred without additional buffer storage in an electrical store beyond buffer storage of the at least one link capacitor of the DC link.

6. The method as claimed in claim 1, further comprising:
    in response to detecting the grid fault, continuing to supply the auxiliary power component to the auxiliary devices without a decrease in an amount of power provided to the auxiliary devices.

7. The method as claimed in claim 1, further comprising:
    in response to detecting the grid fault, disconnecting the wind turbine from the electrical supply grid, such that the feed-in power component is not fed into the electrical supply grid.

8. The method as claimed in claim 1, further comprising:
    in response to detecting the grid fault and following detecting the grid fault, continuing to operate the wind turbine without feeding the feed-in power component into the electrical supply grid until the grid fault is resolved; and
    resuming feeding the feed-in power component into the electrical supply grid following resolving of the grid fault, and/or starting of the electrical supply grid or a portion of the electrical supply grid in a black starting mode following resolving of the grid fault.

9. The method as claimed in claim 8, further comprising:
    controlling a link voltage of a DC link of an inverter to a predetermined standby voltage value using a chopper circuit during the grid fault.

10. The method as claimed in claim 1, wherein the auxiliary devices include at least one auxiliary device from a list including:
    one or more blade adjustment devices for adjusting a blade angle of the rotor blades,
    one or more azimuth adjusting devices for adjusting a nacelle alignment of the wind turbine,
    an exciter generator for generating an exciter current of the generator, the generator being formed as a separately excited synchronous generator,
    ventilating devices for ventilating the wind turbine,
    first cooling devices for cooling the generator,
    second cooling devices for cooling semiconductor components of an inverter and semiconductor components of a chopper circuit of the inverter, and
    a controller for controlling the operation of the wind turbine.

11. The method as claimed in claim 1, wherein:
    the cut-back power is generated at a level that provides at least one temporary power component for temporarily operating at least one auxiliary device of the auxiliary devices, and
    the at least one temporary power component is used for temporarily operating the at least one auxiliary device, or the at least one temporary power component is consumed using a chopper circuit.

12. The method as claimed in claim 11, wherein the at least one auxiliary device is one or more blade adjusting devices for adjusting a blade angle of the rotor blades or one or more azimuth adjusting devices for adjusting a nacelle alignment of the wind turbine.

13. The method as claimed in claim 1, wherein the second portion of the generated electrical power is a difference between a total of the generated electrical power and the first portion of the generated electrical power.

14. The method as claimed in claim 1, wherein consuming the residual power of the cut-back power remaining after drawing the auxiliary power component includes converting the residual power into heat.

15. A wind turbine, comprising:
an aerodynamic rotor having a plurality of rotor blades;
a generator configured to generate electrical power from wind;
one or more auxiliary devices configured to:
perform auxiliary functions for operation of the wind turbine;
use a first portion of the generated electrical power as an auxiliary power component, the auxiliary power component being variable and having an upper auxiliary power limit;
an inverter configured to feed a second portion of the generated electrical power into an electrical supply grid, the second portion forming a feed-in power component; and
a controller configured to:
check the electrical supply grid for a grid fault that hinders feeding the second portion of the generated electrical power of the wind turbine into the electrical supply grid;
detect the grid fault;
continue operating the wind turbine in response to detecting the grid fault;
reduce the generated electrical power from the wind to a cut-back power equivalent to the upper auxiliary power limit or greater than the upper auxiliary power limit;
cause the auxiliary power component for supplying the one or more auxiliary devices to be drawn from the cut-back power; and
cause residual power of the cut-back power to be consumed, the residual power being an amount of the cut-back power remaining after drawing the auxiliary power component.

16. The wind turbine as claimed in claim 15, wherein:
the inverter has a DC link, and
the wind turbine includes a chopper circuit coupled to the DC link, the chopper circuit including a chopper resistor, wherein:
in response to detecting the grid fault, the cut-back power, or a portion of the cut-back power is transferred to the DC link without the inverter feeding the second portion of the generated electrical power into the electrical supply grid, and
the cut-back power or the portion of the cut-back power transferred to the DC link is consumed using the chopper resistor of the chopper circuit, such that the power consumed using the chopper circuit is converted into heat.

17. The wind turbine as claimed in claim 15, wherein the auxiliary devices include at least one auxiliary device from a list including:
one or more blade adjustment devices for adjusting a blade angle of the rotor blades,
one or more azimuth adjusting devices for adjusting a nacelle alignment of the wind turbine,
an exciter generator for generating an exciter current of the generator, the generator being formed as a separately excited synchronous generator,
ventilating devices for ventilating the wind turbine,
first cooling devices for cooling the generator,
second cooling devices for cooling semiconductor components of the inverter and semiconductor components of a chopper circuit, and
the controller.

* * * * *